United States Patent
Xie et al.

(10) Patent No.: US 9,416,017 B2
(45) Date of Patent: Aug. 16, 2016

(54) METHOD FOR MAKING MOLECULAR SIEVE SSZ-98

(71) Applicants: Dan Xie, Richmond, CA (US); Stacey Ian Zones, San Francisco, CA (US); Christopher Michael Lew, Richmond, CA (US); Tracy Margaret Davis, Novato, CA (US)

(72) Inventors: Dan Xie, Richmond, CA (US); Stacey Ian Zones, San Francisco, CA (US); Christopher Michael Lew, Richmond, CA (US); Tracy Margaret Davis, Novato, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 300 days.

(21) Appl. No.: 14/323,473

(22) Filed: Jul. 3, 2014

(65) Prior Publication Data

US 2016/0002060 A1    Jan. 7, 2016

(51) Int. Cl.
   *C01B 39/30*   (2006.01)
   *B01J 29/50*   (2006.01)
   *B01J 29/54*   (2006.01)
   *B01J 29/56*   (2006.01)

(52) U.S. Cl.
   CPC .............. *C01B 39/305* (2013.01); *B01J 29/50* (2013.01); *B01J 29/54* (2013.01); *B01J 29/56* (2013.01); *Y02P 30/42* (2015.11)

(58) Field of Classification Search
   CPC ......... C01B 39/305; B01J 29/50; Y02P 30/42
   See application file for complete search history.

(56) References Cited

U.S. PATENT DOCUMENTS

| | | | |
|---|---|---|---|
| 2,950,952 A | 8/1960 | Breck et al. | |
| 3,699,139 A | 10/1972 | Rubin et al. | |
| 4,086,186 A | 4/1978 | Rubin et al. | |
| 4,503,023 A | 3/1985 | Breck et al. | |
| 7,344,694 B2 | 3/2008 | Miller et al. | |
| 2006/0073094 A1 | 4/2006 | Miller et al. | |
| 2010/0254895 A1 | 10/2010 | Zones | |
| 2016/0001273 A1* | 1/2016 | Xie | B01J 29/56 423/213.5 |
| 2016/0002059 A1* | 1/2016 | Xie | C01B 39/305 423/718 |
| 2016/0002060 A1* | 1/2016 | Xie | C01B 39/305 423/703 |

OTHER PUBLICATIONS

J.M. Bennett and J.A. Gard "Non-identity of the zeolites erionite and offretite" Nature, 1967, 214, 1005-1006.
K.P. Lillerud and J.H. Raeder "On the synthesis of erionite-offretite intergrowth zeolites" Zeolites, 1986, 6, 474-483.
M.L. Occelli, R.A. Innes, S.S. Pollack and J.V. Sanders "Quaternary ammonium cation effects on the crystallization of offretite-erionite type zeolites: Part 1. Synthesis and catalytic properties" Zeolites, 1987, 7, 265-271.
A. Alberti, A. Martucci, E. Galli and Vezzalini "A reexamination of the crystal structure of erionite" Zeolites, 1997, 19, 349-352.
PCT International Search Report, PCT/US2015/022178, mailed Jul. 15, 2015.
M.L Occelli, R.A. Innes and S.S. Pollack "Quaternary ammonium cation effects on the crystallization of offretite-erionite type zeolites: Part 1. Synthesis and catalytic properties" Zeolites 1987, 7, 265-271.

* cited by examiner

*Primary Examiner* — David M Brunsman

(57) ABSTRACT

A method is disclosed for making a new crystalline molecular sieve designated SSZ-98. SSZ-98 has the ERI framework type and is synthesized using a N,N'-dimethyl-1,4-diazabicyclo[2.2.2]octane dication as a structure directing agent.

10 Claims, 6 Drawing Sheets

METHOD FOR MAKING MOLECULAR SIEVE SSZ-98

TECHNICAL FIELD

This disclosure relates to new crystalline molecular sieve designated SSZ-98, a method for preparing SSZ-98 using a N,N'-dimethyl-1,4-diazabicyclo[2.2.2]octane dication as a structure directing agent ("SDA"), and uses for SSZ-98. These materials have the ERI framework type. The method enables control over silica-to-alumina ratio, crystal size, and morphology of these materials.

BACKGROUND

Molecular sieves are a commercially important class of crystalline materials. They have distinct crystal structures with ordered pore structures which are demonstrated by distinct X-ray diffraction patterns. The crystal structure defines cavities and pores which are characteristic of the different species.

Molecular sieves are classified by the Structure Commission of the International Molecular sieve Association (IZA) according to the rules of the IUPAC Commission on Molecular sieve Nomenclature. According to this classification, framework type molecular sieves and other crystalline microporous molecular sieves, for which a structure has been established, are assigned a three letter code and are described in the "Atlas of Molecular sieve Framework Types," Sixth Revised Edition, Elsevier (2007).

ERI framework type materials are characterized by three-dimensional 8-membered-ring pore/channel systems containing double-six-rings (d6R) and cages. Small pore molecular sieves containing d6R building units and cages have shown utility in methanol-to-olefins catalysis and in the selective catalytic reduction of nitrogen oxides ($NO_x$) to name some of the more important commercial applications.

ERI framework type molecular sieves are often intergrown with offretite (OFF) framework type molecular sieves, a topologically related molecular sieve. Intergrown ERI/OFF molecular sieves comprise regions of ERI framework type sequences and regions of OFF framework type sequences. There are number of references which disclose materials that are intergrowths of ERI and OFF. Molecular sieve T is disclosed in U.S. Pat. No. 2,950,952 and later discovered to be an ERI/OFF intergrowth (see J. M. Bennett et al., *Nature*, 1967, 214, 1005-1006). U.S. Pat. No. 3,699,139 discloses the use of a benzyltrimethylammonium cation to synthesize ERI/OFF intergrowth molecular sieves. U.S. Pat. No. 4,086,186 discloses using choline to synthesize ZSM-34 (an intergrowth). U.S. Pat. No. 4,503,023 discloses molecular sieves designated LZ-220 which are more siliceous forms of the known mineral erionite and its synthetic analog, molecular sieve T. M. L. Occelli et al. in *Zeolites*, 1987, 7, 265-271 disclose using templates designated DABCO(I) and DABCO(II) to synthesize ERI/OFF intergrowth molecular sieves.

U.S. Pat. No. 7,344,694 reports synthesizing an essentially pure ERI framework type molecular sieve designated UZM-12. UZM-12 is purported to have a Si/Al ratio of greater than 5.5. UZM-12 can be prepared as nanocrystallites having an average particle size of about 15 to about 50 nm and a spheroidal morphology. UZM-12 is synthesized via a charge-density mismatch approach whereby quaternary ammonium hydroxides are employed to solubilize aluminosilicate species, while crystallization inducing agents such as alkali and alkaline earth metals and more highly charged organoammonium cations are often introduced in a separate step.

SUMMARY

The present disclosure is directed to a new family of crystalline molecular sieves with unique properties, referred to herein as "molecular sieve SSZ-98" or simply "SSZ-98." SSZ-98 has the framework type designated "ERI" by the IZA.

In one aspect there is provided a crystalline ERI framework type molecular sieve having a mole ratio of from 15 to 50 of silicon oxide to aluminum oxide. The molecular sieve has either a rod-like crystal morphology or a plate crystal morphology. The SSZ-98 molecular sieve has, in its as-synthesized form, the X-ray diffraction lines of Table 3.

In another aspect, there is provided a method for preparing an ERI framework type molecular sieve by contacting under crystallization conditions: (1) at least one source of silicon oxide; (2) at least one source of aluminum oxide; (3) one or more sources of one or more elements selected from Groups 1 and 2 of the Periodic Table; (4) hydroxide ions; (5) a N,N'-dimethyl-1,4-diazabicyclo[2.2.2]octane dication; and (6) optionally, 18-crown-6.

There is also provided a process for preparing a crystalline molecular sieve by: (a) preparing a reaction mixture containing: (1) at least one source of silicon oxide; (2) at least one source of aluminum oxide; (3) one or more sources of one or more elements selected from Groups 1 and 2 of the Periodic Table; (4) hydroxide ions; (5) a N,N'-dimethyl-1,4-diazabicyclo[2.2.2]octane dication; (6) optionally, 18-crown-6; and (7) water; and (b) subjecting the reaction mixture to crystallization conditions sufficient to form crystals of the molecular sieve. The present disclosure includes such a method wherein the crystalline molecular sieve has the ERI framework type and wherein the molecular sieve has, in its as-synthesized form, the X-ray diffraction lines of Table 3.

The present disclosure further provides a crystalline molecular sieve having a composition, as-synthesized and in its anhydrous state, in terms of mole ratios as follows:

|  | Broad | Exemplary |
|---|---|---|
| $SiO_2/Al_2O_3$ | 15 to 50 | 20 to 40 |
| $(Q + A)/SiO_2$ | 0.01 to 0.10 | 0.01 to 0.10 |
| $M/SiO_2$ | 0.01 to 0.20 | 0.01 to 0.20 | wherein (1) Q is a N,N'-dimethyl-1,4-diazabicyclo[2.2.2]octane dication, and Q>0; (2) A is 18-crown-6, and A≥0; and (3) M is selected from the group consisting of elements from Groups 1 and 2 of the Periodic Table.

DETAILED DESCRIPTION

Introduction

Figure 1:
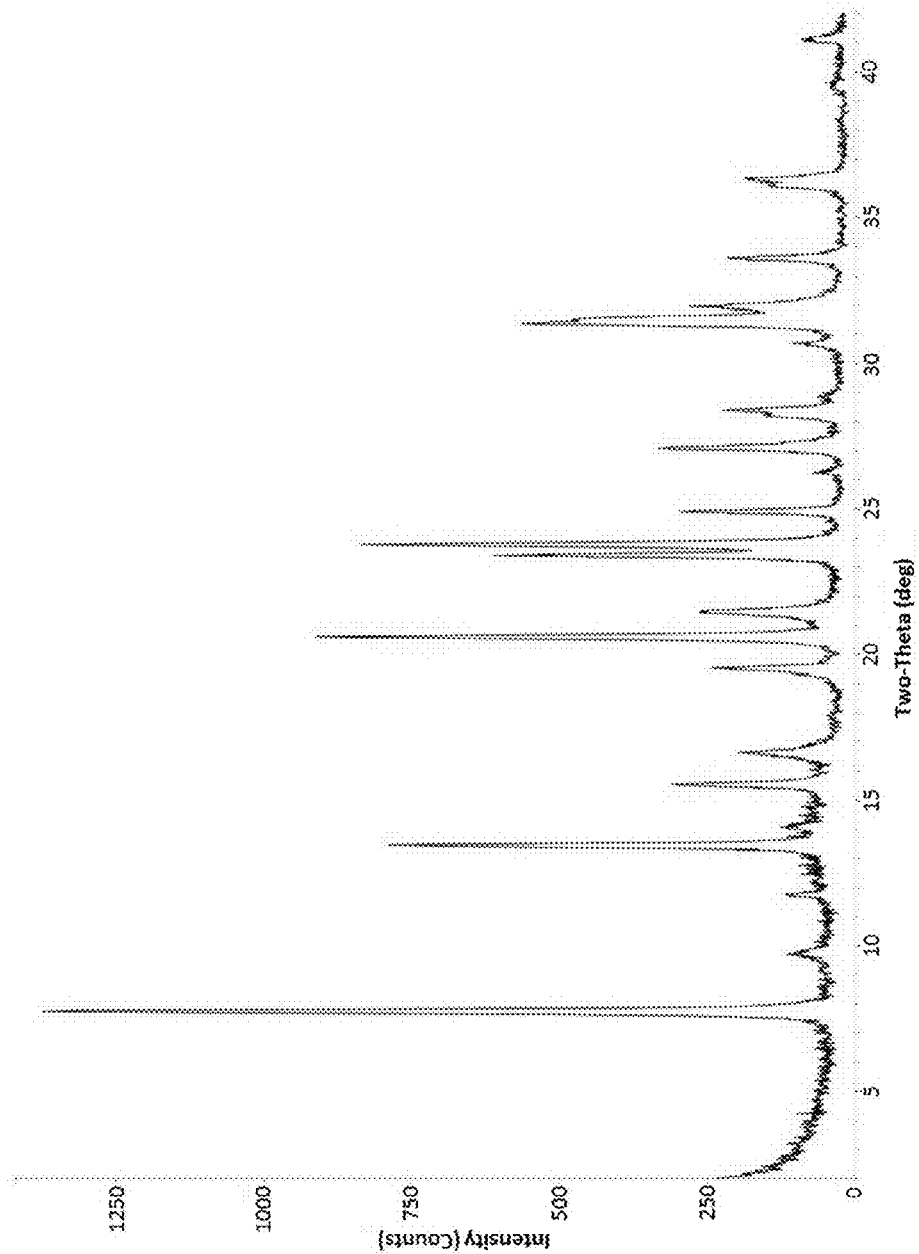
FIG. 1 is a powder X-ray diffraction (XRD) pattern of the as-synthesized molecular sieve prepared in Example 1.

The following terms will be used throughout the specification and will have the following meanings unless otherwise indicated.

The term "framework type" is used in the sense described in the "Atlas of Molecular sieve Framework Types," Sixth Revised Edition, Elsevier (2007).

As used herein, the numbering scheme for the Periodic Table Groups is as disclosed in *Chem. Eng. News,* 63(5), 27 (1985).

In preparing SSZ-98, a N,N'-dimethyl-1,4-diazabicyclo[2.2.2]octane dication ("dimethyl DABCO dication") is used, either alone or in combination with 18-crown-6 (designated compositional variable "A" herein), as an organic structure directing agent ("SDA"). The SDAs useful for making the molecular sieve are represented by the following structures (1) and (2), respectively:

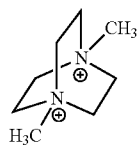
(1)

N,N'-dimethyl-1,4-diazabicyclo[2.2.2]octane dication

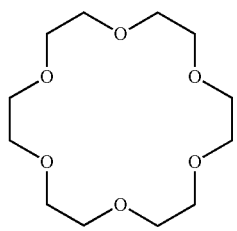
(2)

18-crown-6

The dimethyl DABCO dication is associated with anions which can be any anion that is not detrimental to the formation of the molecular sieve. Representative anions include elements from Group 17 of the Periodic Table (e.g., fluoride, chloride, bromide and iodide), hydroxide, acetate, sulfate, tetrafluoroborate, carboxylate, and the like.

Reaction Mixture

In general, the molecular sieve is prepared by: (a) preparing a reaction mixture containing (1) at least one source of silicon oxide; (2) at least one source of aluminum oxide; (3) one or more sources of one or more elements selected from Groups 1 and 2 of the Periodic Table; (4) hydroxide ions; (5) a N,N'-dimethyl-1,4-diazabicyclo[2.2.2]octane dication; (6) optionally, 18-crown-6; and (7) water; and (b) subjecting the reaction mixture to crystallization conditions sufficient to form crystals of the molecular sieve.

The composition of the reaction mixture from which the molecular sieve is formed, in terms of mole ratios, is identified in Table 1 below:

TABLE 1

| Components | Broad | Exemplary |
|---|---|---|
| $SiO_2/Al_2O_3$ | 10 to 50 | 20 to 40 |
| $M/SiO_2$ | 0.01 to 1.0 | 0.1 to 0.6 |
| $(Q + A)/SiO_2$ | 0.05 to 0.5 | 0.1 to 0.5 |
| $OH/SiO_2$ | 0.1 to 1.0 | 0.2 to 0.7 |
| $H_2O/SiO_2$ | 10 to 50 | 10 to 25 | wherein (1) Q is a N,N'-dimethyl-1,4-diazabicyclo[2.2.2]octane dication, and Q>0; (2) A is 18-crown-6, and A≥0; and (3) M is selected from the group consisting of elements from Groups 1 and 2 of the Periodic Table In embodiments, the A/Q mole ratio of the reaction mixture is from 0 to 1 (e.g., from 0 to 0.5, from 0 to 0.35, from 0.01 to 1, from 0.01 to 0.5, or from 0.01 to 0.35).

Sources of silicon oxide useful herein include fumed silica, precipitated silicates, silica hydrogel, silicic acid, colloidal silica, tetra-alkyl orthosilicates (e.g., tetraethyl orthosilicate), and silica hydroxides.

Sources of aluminum oxide useful herein include aluminates, alumina, and aluminum compounds such as $AlCl_3$, $Al_2(SO_4)_3$, $Al(OH)_3$, kaolin clays, and other molecular sieves. Examples of the source of aluminum oxide include LZ-210 zeolite and Zeolyst International's CBV 720 (types of zeolite Y).

As described herein above, for each embodiment described herein, the reaction mixture can be formed using at least one source of one or more elements selected from Groups 1 and 2 of the Periodic Table (referred to herein as M). Any M-containing compound which is not detrimental to the crystallization process is suitable. Sources for such Groups 1 and 2 elements include oxides, hydroxides, nitrates, sulfates, halides, acetates, oxalates, and citrates thereof. In one embodiment, M is potassium. In another embodiment, M is a combination of potassium and strontium.

The reaction mixture can also comprise seed crystals having a framework type of ERI, KFI, or a combination thereof to facilitate the crystallization process. When seed crystals are present, the mole ratio of seed crystals/$SiO_2$ in the reaction mixture is from 0.001 to 0.1, e.g., from 0.01 to 0.05.

For each embodiment described herein, the molecular sieve reaction mixture can be supplied by more than one source. Also, two or more reaction components can be provided by one source.

The reaction mixture can be prepared either batch wise or continuously. Crystal size, morphology and crystallization time of the molecular sieve described herein can vary with the nature of the reaction mixture and the crystallization conditions.

Crystallization and Post-Synthesis Treatment

In practice, the molecular sieve is prepared by: (a) preparing a reaction mixture as described herein above; and (b) subjecting the reaction mixture to crystallization conditions sufficient to form crystals of the molecular sieve.

The reaction mixture is maintained at an elevated temperature until the molecular sieve is formed. The hydrothermal crystallization is usually conducted under pressure, and usually in an autoclave so that the reaction mixture is subject to autogenous pressure, at a temperature between 125° C. and 200° C.

The reaction mixture can be subjected to mild stirring or agitation during the crystallization step. It will be understood by one skilled in the art that the crystallized molecular sieves described herein can contain impurities, such as amorphous materials, unit cells having framework topologies which do not coincide with the molecular sieve, and/or other impurities (e.g., organic hydrocarbons).

Once the molecular sieve has formed, the solid product is separated from the reaction mixture by standard mechanical separation techniques such as filtration. The crystals are water-washed and then dried to obtain the as-synthesized molecular sieve crystals. The drying step can be performed at atmospheric pressure or under vacuum.

The molecular sieve can be used as-synthesized, but typically will be thermally treated (calcined). The term "as-synthesized" refers to the molecular sieve in its form after crystallization, prior to removal of the structure directing agent(s). The structure directing agent(s) can be removed by thermal treatment (e.g., calcination), preferably in an oxidative atmosphere (e.g., air, gas with an oxygen partial pressure of greater than 0 kPa) at a temperature readily determinable by one skilled in the art sufficient to remove the structure directing agent(s) from the molecular sieve. The structure directing agent(s) can also be removed by photolysis techniques (e.g., exposing the SDA-containing molecular sieve product to light or electromagnetic radiation that has a wavelength shorter than visible light under conditions sufficient to selectively remove the organic compound from the molecular sieve) as described in U.S. Pat. No. 6,960,327.

The molecular sieve can subsequently be calcined in steam, air or inert gas at temperatures ranging from 200° C. to 800° C. for periods of time ranging from 1 to 48 hours, or more. Usually, it is desirable to remove the extra-framework cation (e.g., $K^+$) by ion-exchange or other known method and replace it with hydrogen, ammonium, or any desired metal-ion.

Where the molecular sieve formed is an intermediate material, the target molecular sieve can be achieved using post-synthesis techniques to allow for the synthesis of a target molecular sieve material having a higher silica-to-alumina ratio from an intermediate material by acid leaching or other similar dealumination methods.

The molecular sieves made from the process of the present invention can be formed into a wide variety of physical shapes. Generally speaking, the molecular sieve can be in the form of a powder, a granule, or a molded product, such as an extrudate having a particle size sufficient to pass through a 2-mesh (Tyler) screen and be retained on a 400-mesh (Tyler) screen. In cases where the catalyst is molded, such as by extrusion with an organic binder, the molecular sieve can be extruded before drying, or dried or partially dried and then extruded.

The molecular sieve can be composited with other materials resistant to temperature and other conditions employed in organic conversion processes. Such matrix materials include active and inactive materials and synthetic or naturally occurring molecular sieves as well as inorganic materials such as clays, silica and metal oxides. Examples of such materials and the manner in which they can be used are disclosed in U.S. Pat. Nos. 4,910,006 and 5,316,753.

Characterization of the Molecular Sieve

Molecular sieves made by the process described herein have a composition, as-synthesized and in the anhydrous state, as described in Table 2 (in terms of mole ratios):

TABLE 2

|  | Broad | Exemplary |
|---|---|---|
| $SiO_2/Al_2O_3$ | 15 to 50 | 20 to 40 |
| $(Q + A)/SiO_2$ | 0.01 to 0.10 | 0.01 to 0.10 |
| $M/SiO_2$ | 0.01 to 0.20 | 0.01 to 0.20 | wherein compositional variables Q, A and M are as described herein above.

SSZ-98 has the ERI framework topology. It is characterized by its X-ray diffraction pattern. The X-ray diffraction pattern lines of Table 3 are representative of as-synthesized SSZ-98 made in accordance with this disclosure.

TABLE 3

Characteristic Peaks for As-Synthesized SSZ-98

| 2-Theta[a] | d-spacing (nm) | Relative Intensity[b] |
|---|---|---|
| 7.78 | 1.136 | VS |
| 9.74 | 0.907 | W |
| 11.79 | 0.750 | W |
| 13.46 | 0.657 | S |
| 14.10 | 0.627 | W |
| 15.53 | 0.570 | M |
| 16.62 | 0.533 | W |
| 19.51 | 0.455 | W |
| 20.56 | 0.432 | VS |
| 21.40 | 0.415 | M |
| 23.38 | 0.380 | S |
| 23.76 | 0.374 | VS |
| 24.88 | 0.358 | W |

[a] ±0.20
[b] The powder XRD patterns provided are based on a relative intensity scale in which the strongest line in the X-ray pattern is assigned a value of 100: W = weak (>0 to ≤20); M = medium (>20 to ≤40); S = strong (>40 to ≤60); VS = very strong (>60 to ≤100).

The X-ray diffraction pattern lines of Table 4 are representative of calcined SSZ-98 made in accordance with this disclosure.

TABLE 4

Characteristic Peaks for Calcined SSZ-98

| 2-Theta[a] | d-spacing (nm) | Relative Intensity[b] |
|---|---|---|
| 7.76 | 1.138 | VS |
| 9.78 | 0.904 | W |
| 11.79 | 0.750 | W |
| 13.45 | 0.658 | VS |
| 14.07 | 0.629 | W |
| 15.51 | 0.571 | W |
| 16.61 | 0.533 | W |
| 19.50 | 0.455 | W |
| 20.54 | 0.432 | S |
| 21.39 | 0.415 | W |
| 23.37 | 0.380 | M |
| 23.73 | 0.375 | S |
| 24.92 | 0.357 | W |

[a] ±0.20
[b] The powder XRD patterns provided are based on a relative intensity scale in which the strongest line in the X-ray pattern is assigned a value of 100: W = weak (>0 to ≤20); M = medium (>20 to ≤40); S = strong (>40 to ≤60); VS = very strong (>60 to ≤100).

The crystallized ERI framework type materials disclosed herein are preferably "substantially free of OFF framework type materials" as determined by X-ray diffraction. The term "substantially free of OFF framework type materials" as used herein means that the ERI framework type materials disclosed herein contain less than 2.5% OFF framework type character, e.g., less than 1% OFF framework type character, less than 0.5% OFF framework type character, or no measurable OFF framework type character.

Minor variations in the X-ray diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation. Calcination can also cause minor shifts in the X-ray diffraction pattern. Notwithstanding these minor perturbations, the basic crystal lattice structure remains unchanged.

The powder X-ray diffraction patterns presented herein were collected by standard techniques. The radiation was $CuK_\alpha$ radiation. The peak heights and the positions, as a function of 2θ where θ is the Bragg angle, were read from the relative intensities of the peaks (adjusting for background), and d, the interplanar spacing corresponding to the recorded lines, can be calculated.

Processes Using SSZ-98

SSZ-98 is useful as an adsorbent for gas separations. SSZ-98 can also be used as a catalyst for converting oxygenates (e.g., methanol) to olefins and for making small amines. SSZ-98 can be used to reduce oxides of nitrogen in a gas streams, such as automobile exhaust. SSZ-98 can also be used to as a cold start hydrocarbon trap in combustion engine pollution control systems. SSZ-98 is particularly useful for trapping $C_3$ fragments.

EXAMPLES

The following illustrative examples are intended to be non-limiting.

Example 1

0.74 g of a 45% KOH solution, 4.57 g of deionized water and 0.21 g of a 50% aluminum hydroxide solution (Barcroft™ 0250 aluminum hydroxide, SPI Pharma) were mixed together in a Teflon liner. Then, 1.85 g of a 19% dimethyl DABCO hydroxide solution was added to the mixture. Next, 2.00 g of colloidal silica (LUDOX® AS-40, W.R. Grace & Co.) was added to the mixture and the gel was stirred until it became homogeneous. The liner was then capped and placed within a Parr steel autoclave reactor. The autoclave was placed in an oven and heated at 140° C. for 5 days and then at 180° C. for another 3-4 days. The solid products were recovered from the cooled by centrifugation, washed with deionized water and dried at 95° C.

The resulting product had a $SiO_2/AlO_3$ mole ratio of 10.6 as determined by ICP elemental analysis.

Figure 2:
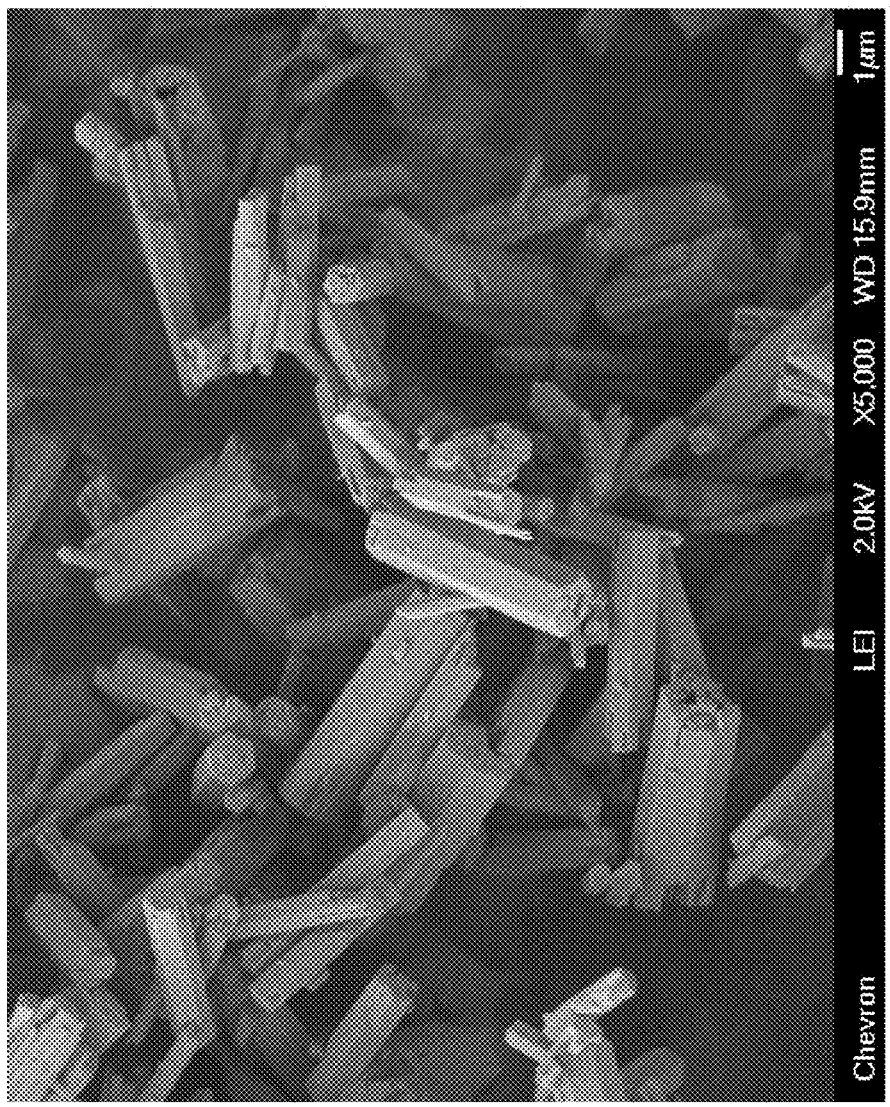
FIG. 2 is a Scanning Electron Microscopy (SEM) image of the as-synthesized molecular sieve prepared in Example 1.
Figure 3:
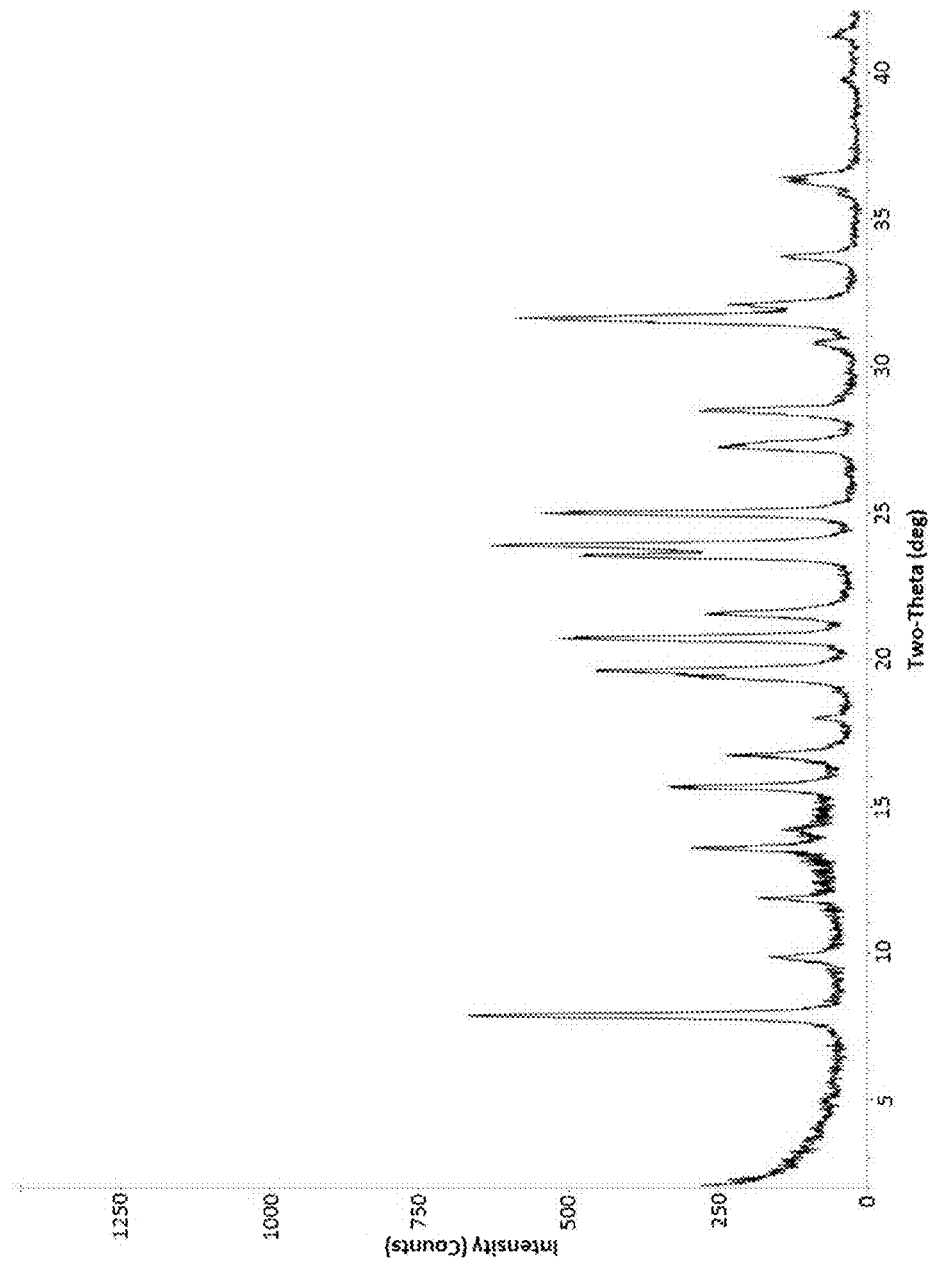
FIG. 3 is a powder XRD pattern of the calcined molecular sieve prepared in Example 1.

The resulting product was analyzed by powder XRD and SEM. The powder X-ray diffraction pattern for the as-synthesized product is shown in FIG. 1 and indicates that the material is a single phase ERI framework type molecular sieve. SEM image (FIG. 2) for the as-synthesized product shows predominantly a rod-like crystal morphology. As used herein, the term "rod-like" refers to a shape which is elongated along one axial direction, and in which the thickness is substantially constant along the longest axis.

The as-synthesized product was then calcined inside a muffle furnace under a flow of air heated to 595° C. at a rate of 1° C./min and held at 595° C. for five hours. The powder XRD pattern indicated that the material remains stable after calcination to remove the organic SDA.

The calcined product was subjected to a micropore volume analysis using $N_2$ as adsorbate and via the BET method. The measured micropore volume was 0.15 cm³/g. The calcined product after ammonium ion-exchange had a micropore volume of 0.20 cm³/g.

Example 2

1.72 g of a 45% KOH solution, 0.57 g of deionized water and 0.41 g of a 50% aluminum hydroxide solution (Barcroft™ 0250 aluminum hydroxide) were mixed together in a Teflon liner. Then, 9.24 g of a 19% dimethyl DABCO hydroxide solution was added to the mixture. Next, 6.07 g of colloidal silica (LUDOX® AS-40) and 0.38 g of ERI seeds were added to the mixture and the gel was stirred until it became homogeneous. The liner was then capped and placed within a Parr steel autoclave reactor. The autoclave was placed in an oven and heated at 150° C. for 5 days. The solid products were recovered from the cooled by centrifugation, washed with deionized water and dried at 95° C.

The resulting product had a $SiO_2/Al_2O_3$ mole ratio of 17.3 as determined by ICP elemental analysis.

Figure 4:
FIG. 4 is a SEM image of the as-synthesized molecular sieve prepared in Example 2.

The as-synthesized product was analyzed by powder XRD and SEM. The X-ray diffraction pattern showed the product to be a single phase ERI framework type molecular sieve. The SEM image (FIG. 4) for the as-synthesized product shows predominantly a plate crystal morphology. Preferably, the plate crystal morphology is such as the width (W) and the thickness (T) are as follows: W/T is ≥10 and advantageously ranges from 10 to 100.

Example 3

8.17 g of a 45% KOH solution, 10.41 g of deionized water and 10.19 g of LZ-210 (dealuminated Y-molecular sieve with a $SiO_2/Al_2O_3$ mole ratio of 13) were mixed. Then, 30.35 g of a 19% dimethyl DABCO hydroxide solution was added to the mixture. Next, 8.65 g of colloidal silica (LUDOX® AS-40) was added to the mixture and the gel was stirred until it became homogeneous. The solution was then transferred to a Teflon liner and was capped and placed within a Parr steel autoclave reactor. The autoclave was placed in an oven and heated at 150° C. for 6 days. The solid products were recovered from the cooled by centrifugation, washed with deionized water and dried at 95° C.

The resulting product had a $SiO_2/Al_2O_3$ mole ratio of 15.1 as determined by ICP elemental analysis.

Figure 5:
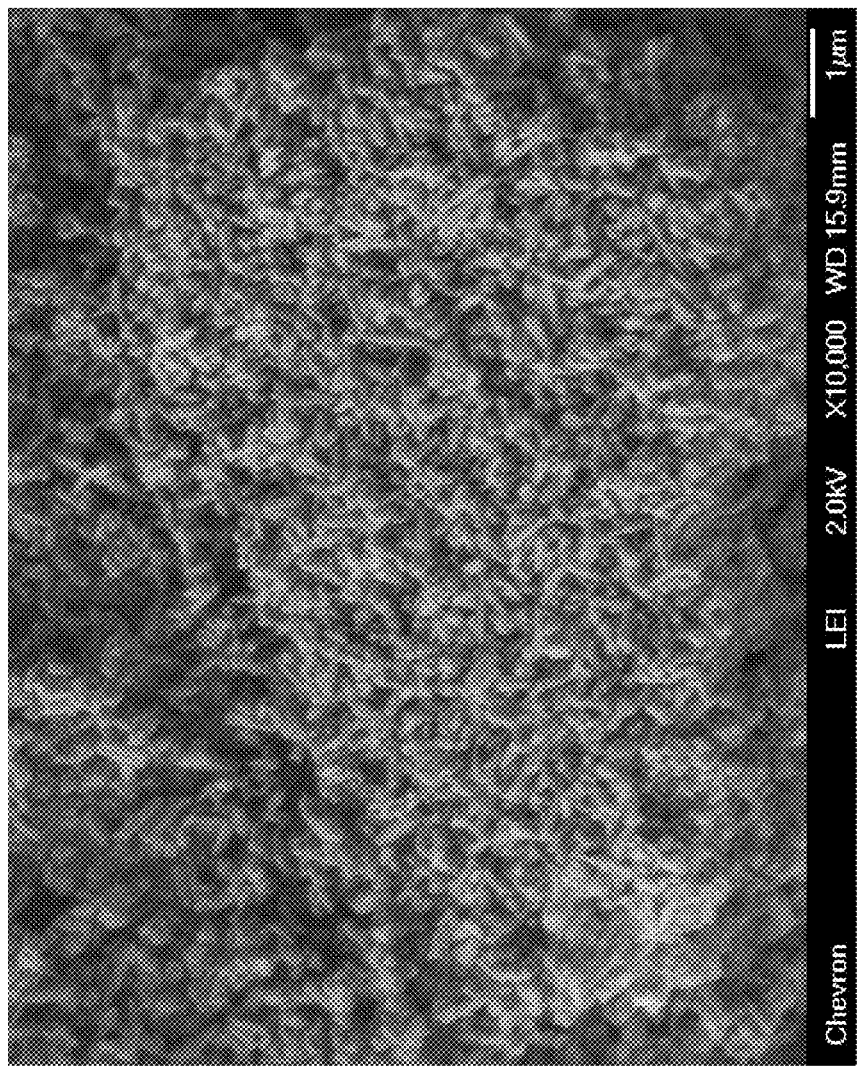
FIG. 5 is a SEM image of the as-synthesized molecular sieve prepared in Example 3.

The reaction product was analyzed by powder XRD and SEM. The X-ray diffraction pattern showed the product to be a single phase ERI framework type molecular sieve. The SEM image (FIG. 5) for the as-synthesized product indicates that the crystal sizes are much smaller than the ones made by Examples 1 and 2.

Example 4

0.82 g of a 45% KOH solution, 2.2 g of deionized water, 1.98 g of a 20% 1,4-dimethyl DABCO hydroxide solution and 1.09 g of CBV 720 (dealuminated Y-molecular sieve with $SiO_2/Al_2O_3=30$, Zeolyst International) were combined in a Teflon liner. The liner was capped and magnetically stirred at room temperature for 3 days. Afterwards, the liner was placed into a stainless steel Parr autoclave and heated at 150° C. for 7 days. The solid products were recovered from the cooled by centrifugation, washed with deionized water and dried at 95° C. The powder X-ray diffraction pattern showed the as-synthesized product to be a single phase ERI framework type molecular sieve.

The product had a $SiO_2/Al_2O_3$ mole ratio of 27.0 as determined by ICP elemental analysis.

Examples 5-21

The procedure of was Example 1 repeated but with the amounts of starting materials being adjusted and/or different Al sources to produce reaction mixtures having the particular mole ratios set forth in Table 5 below. Crystallization was conducted in the same manner as described in Examples 1-4, although in some cases, as shown in Table 5, the crystallization conditions varied somewhat.

Figure 6:
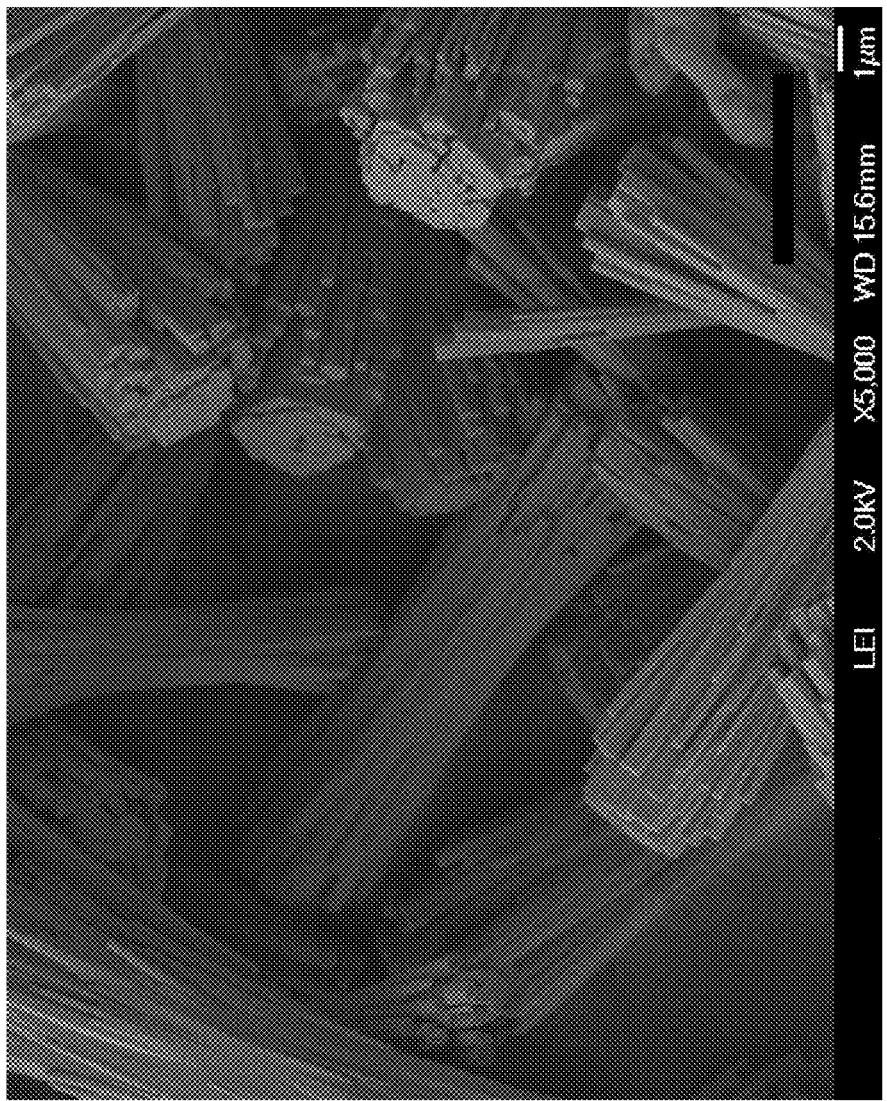
FIG. 6 is a SEM image of the as-synthesized molecular sieve prepared in Example 13.

FIG. 6 is a SEM image of the as-synthesized product of Example 13.

TABLE 5

| Ex. No. | $SiO_2/Al_2O_3$ | $KOH/SiO_2$ | $SrO/SiO_2$ | $Q/SiO_2$ | $A/SiO_2$ | $H_2O/SiO_2$ | ERI Seeds/$SiO_2$ | KFI Seeds/$SiO_2$ | Conditions | Product | Product $SiO_2/Al_2O_3$ |
|---|---|---|---|---|---|---|---|---|---|---|---|
| 5  | 16.7 | 0.45 | 0    | 0.15 | 0   | 16 | 0    | 0    | 170° C./static/5 d         | ERI | 12.3 |
| 6  | 20   | 0.40 | 0    | 0.15 | 0   | 16 | 0.03 | 0    | 150° C./static/6 d         | ERI | 16.1 |
| 7  | 20   | 0.40 | 0    | 0.15 | 0   | 16 | 0.03 | 0    | 170° C./static/5 d         | ERI | 17.2 |
| 8  | 22.2 | 0.35 | 0    | 0.20 | 0   | 16 | 0.03 | 0    | 150° C./43 rpm rotation/5 d | ERI | 18.5 |
| 9  | 25   | 0.40 | 0    | 0.15 | 0   | 16 | 0.03 | 0    | 150° C./static/6 d         | ERI | 20.2 |
| 10 | 28.6 | 0.40 | 0    | 0.15 | 0   | 16 | 0.03 | 0    | 150° C./static/6 d         | ERI | 25.0 |
| 11 | 33.4 | 0.40 | 0    | 0.15 | 0.1 | 12 | 0.03 | 0    | 150° C./static/6 d         | ERI | 25.7 |
| 12 | 25   | 0.45 | 0    | 0.15 | 0   | 15 | 0    | 0    | 150° C./static/7 d         | ERI | 23.0 |
| 13 | 10   | 0.46 | 0.01 | 0.3  | 0.1 | 22 | 0    | 0    | 150° C./static/5 d         | ERI |      |
| 14 | 10   | 0.46 | 0.01 | 0.3  | 0.1 | 22 | 0    | 0.03 | 150° C./static/5 d         | ERI |      |
| 15 | 10   | 0.46 | 0    | 0.3  | 0.1 | 22 | 0    | 0    | 150° C./static/5 d         | ERI |      |
| 16 | 10   | 0.46 | 0    | 0.3  | 0.1 | 22 | 0    | 0.03 | 150° C./static/5 d         | ERI |      |
| 17 | 20   | 0.46 | 0.01 | 0.3  | 0.1 | 22 | 0    | 0    | 150° C./static/5 d         | ERI |      |
| 18 | 20   | 0.46 | 0.01 | 0.3  | 0.1 | 22 | 0    | 0.03 | 150° C./static/5 d         | ERI |      |
| 19 | 10   | 0.46 | 0    | 0.2  | 0.1 | 22 | 0    | 0.03 | 150° C./static/5 d         | ERI |      |
| 20 | 40   | 045  | 0    | 0.15 | 0   | 16 | 0    | 0    | 150° C./43 rpm rotation/7 d | ERI | 19 |
| 21 | 40   | 0.45 | 0    | 0.15 | 0   | 15 | 0    | 0    | 150° C./43 rpm rotation/7 d | ERI | 14 |

Q = N,N'-dimethyl-1,4-diazabicyclo[2.2.2]octane dication
A = 18-crown-6

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A method for preparing an ERI framework type molecular sieve, comprising:
   (a) preparing a reaction mixture containing: (1) at least one source of silicon oxide; (2) at least one source of aluminum oxide; (3) one or more sources of one or more elements selected from Groups 1 and 2 of the Periodic Table; (4) hydroxide ions; (5) a N,N'-dimethyl-1,4-diazabicyclo[2.2.2]octane dication; (6) optionally, 18-crown-6; and (7) water; and
   (b) subjecting the reaction mixture to crystallization conditions sufficient to form crystals of the molecular sieve.

2. The method of claim 1, wherein the molecular sieve is prepared from a reaction mixture comprising, in terms of mole ratios, the following:

| | |
|---|---|
| $SiO_2/Al_2O_3$ | 10 to 50 |
| $M/SiO_2$ | 0.01 to 1.0 |
| $(Q + A)/SiO_2$ | 0.05 to 0.5 |
| $OH/SiO_2$ | 0.1 to 1.0 |
| $H_2O/SiO_2$ | 10 to 50 | wherein:
   (1) M is selected from the group consisting of elements from Groups 1 and 2 of the Periodic Table;
   (2) Q is a N,N'-dimethyl-1,4-diazabicyclo[2.2.2]octane dication, and Q>0; and
   (3) A is 18-crown-6, and A≥0.

3. The method of claim 2, wherein the molecular sieve is prepared from a reaction mixture comprising, in terms of mole ratios, the following:

| | |
|---|---|
| $SiO_2/Al_2O_3$ | 20 to 40 |
| $M/SiO_2$ | 0.1 to 0.6 |
| $(Q + A)/SiO_2$ | 0.1 to 0.5 |
| $OH/SiO_2$ | 0.2 to 0.7 |
| $H_2O/SiO_2$ | 10 to 25. |

4. The method of claim 2, wherein M is potassium.

5. The method of claim 2, wherein M is a combination of potassium and strontium.

6. The method of claim 2, wherein the reaction mixture further comprises seed crystals having a framework type of ERI, KFI, or a combination thereof.

7. The method of claim 6, wherein the seed crystals are present in an amount such that the mole ratio of seed crystals/$SiO_2$ in the reaction mixture is from 0.001 to 0.1.

8. The method of claim 1, wherein the molecular sieve has less than 2.5% OFF framework type character as determined by X-ray diffraction.

9. The method of claim 1, wherein the molecular sieve has a composition, as-synthesized and in its anhydrous state, in terms of mole ratios, as follows:

| | |
|---|---|
| $SiO_2/Al_2O_3$ | 15 to 50 |
| $(Q + A)/SiO_2$ | 0.01 to 0.10 |
| $M/SiO_2$ | 0.01 to 0.20 | wherein:
(1) Q is a N,N'-dimethyl-1,4-diazabicyclo[2.2.2]octane dication, and Q>0;
(2) A is 18-crown-6, and A≥0; and
(3) M is selected from the group consisting of elements from Groups 1 and 2 of the Periodic Table.

10. The method of claim 1, wherein the molecular sieve has, in its as-synthesized form, an X-ray diffraction pattern substantially as shown in the following Table:

| 2-Theta | d-spacing (nm) | Relative Intensity |
|---|---|---|
| 7.78 ± 0.20 | 1.136 | VS |
| 9.74 ± 0.20 | 0.907 | W |
| 11.79 ± 0.20 | 0.750 | W |
| 13.46 ± 0.20 | 0.657 | S |
| 14.10 ± 0.20 | 0.627 | W |
| 15.53 ± 0.20 | 0.570 | M |
| 16.62 ± 0.20 | 0.533 | W |
| 19.51 ± 0.20 | 0.455 | W |
| 20.56 ± 0.20 | 0.432 | VS |
| 21.40 ± 0.20 | 0.415 | M |
| 23.38 ± 0.20 | 0.380 | S |
| 23.76 ± 0.20 | 0.374 | VS |
| 24.88 ± 0.20 | 0.358 | W. |

* * * * *